July 24, 1928.
W. L. MARDEN
1,677,923
GASOLINE FILLING STATION AND THE LIKE
Filed Jan. 10, 1927
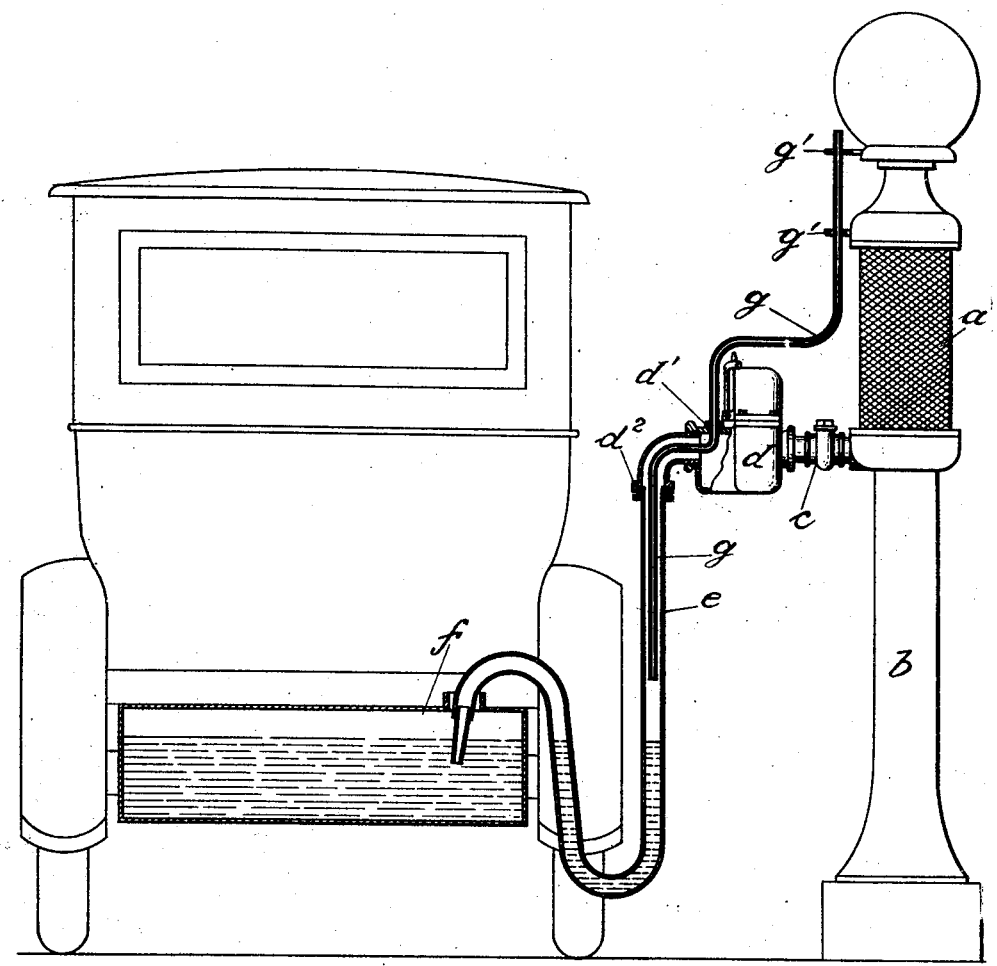
Inventor
William L. Marden
By his Attorneys
Redding, Greeley, O'Shea & Campbell Patented July 24, 1928.

1,677,923

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

GASOLINE FILLING STATION AND THE LIKE.

Application filed January 10, 1927. Serial No. 160,102.

This invention relates to apparatus such as that which is employed in the delivery of a liquid, such as gasoline, by gravity from an elevated source of supply, such as the ordinary visible measuring vessel, through a hose to a receptacle, such as the gasoline tank of an automobile, the filling hole of which is elevated somewhat above the ground or road surface. The delivery pipe or hose in such an installation as a matter of practical convenience has a length considerably greater than the distance in a straight line from the outlet of the visible measuring vessel or other source of supply to the filling hole of the receptacle when the receptacle is located at the nearest point to the filling apparatus, because the automobile, for example, is not always placed close to the filling apparatus but may be located at some little distance therefrom. The hose or filling pipe therefore usually has such length that oftentimes the slack of the hose rests upon the ground or road surface. Ordinarily, in the operation of filling, the hose is lifted from the ground toward the close of the operation so that all of the gasoline or other liquid contained in the hose shall be discharged into the gasoline tank or other receptacle. Consequently when another automobile, for example, is to receive a supply of gasoline, the hose or delivery pipe is empty and the next operation is performed without difficulty in the same manner as the preceding operation. As a general rule, the visible measuring vessel or source of supply has a capacity of say five gallons, which is less than the capacity of the receptacle to be filled, so that it often happens that the measuring vessel or source of supply must be filled or partially filled again to supply the needs of the customer. If the attendant lifts the hose from the ground and empties the hose completely after the first quantity is delivered, the second operation takes place as did the first, but the lifting and draining of the hose takes time and the attendant often fails to perform these operations. When, therefore, the discharge of the second measured quantity from the source of supply takes place the gasoline or other liquid finds the hose filled in the inverted siphon formed by the hose, as it lies on the ground, up to the approximate level of the top of the receptacle, with air or vapor trapped between the outlet of the source of supply and the liquid in the hose. The distance from the ground to the level of the top of the receptacle is commonly considerably greater than the height of the visible measuring vessel itself so that the head under which the liquid flows from the measuring vessel into the upper or inlet end of the hose, even at the beginning of the operation, is less than the height of the column of liquid in the inverted siphon, at least after a part of the liquid therein has been expelled. Not only is the resistance offered by the liquid in the inverted siphon greater than this head under which it flows from the source of supply into the upper end of the hose, but the column of air or vapor between the source of supply and the liquid in the inverted siphon is compressible. The result is that the flow of the second measured quantity from the source of supply is greatly interfered with and is retarded, although in the course of time the air or vapor might bubble up through the liquid in the source of supply and so permit the hose to be completely filled, and the head under which the liquid flows to be increased above the resistance. Such delay, however, would be greater than that occasioned by the lifting of the hose by the attendant from the ground. As a matter of fact, the difficulty above described is often met and hitherto no way has been found to meet the difficulty except by requiring the attendant to lift the hose from the ground and empty it after the delivery of the first measured quantity. By the present invention, however, the difficulty is overcome and the flow of the second measured quantity from the measuring vessel may take place as readily as the flow of the first measured quantity without requiring the attendant to lift the hose from the ground.

In accordance with the invention a vent pipe is associated with or operatively related to the delivery pipe or hose in such manner that the lower end of the vent pipe is approximately at the level of the top of the receptacle to be filled, while the upper end of the vent pipe is above the level of the liquid in the measuring vessel or source of supply. By this means all of the air or vapor in the delivery pipe or hose between the source of supply and the level of the top of the receptacle is expelled, so that a solid column of liquid fills the hose from the measuring vessel to the receptacle to be filled and its head overcomes the resistance offered by the liquid in the discharge member of the inverted siphon and the flow takes place freely. The elevation of the upper end of the vent pipe above the supply vessel prevents the loss of any liquid through the vent pipe.

The invention will be explained more fully hereinafter with reference to the accompanying drawing, the single figure of which is a view partly in elevation, partly in vertical section and somewhat diagrammatic of a filling apparatus of usual construction and arrangement but with the present invention applied thereto, an automobile with its gasoline tank being also represented.

In the drawing the usual visible measuring vessel of glass is indicated at $a$ as the source of supply, the measuring vessel being supported upon a suitable pedestal $b$ and arranged to be filled by any suitable means, not necessary to be shown. The measuring vessel is arranged to be discharged through a valve controlled outlet $c$ and, in the apparatus shown, through a meter $d$, from which the gasoline or other liquid is delivered through a hose or delivery pipe $e$ into a receptacle $f$, such as the gasoline tank of an automobile. In the arrangement illustrated, the hose $e$ is represented as forming an inverted siphon below the level of the top of the receptacle $f$, although it is not shown in this instance as resting on the ground or road surface, the formation of an inverted siphon such as that indicated being sufficient to create the difficulty above described. Associated with or operatively related to the delivery pipe or hose is a vent pipe $g$. Obviously this might be arranged in various ways with respect to the delivery pipe, but the arrangement illustrated is convenient for the user as well as for the installer. As shown, the vent pipe is introduced through the casing $d'$ of the meter $d$ and through the coupling $d^2$ to which the hose $e$ is connected in the usual manner and is carried upward to a point above the measuring vessel $a$, being conveniently supported by brackets $g'$. The vent pipe may be formed of any suitable material, either flexible or rigid, as may be most convenient, and as indicated above, it may be arranged with respect to the source of supply, the meter and the delivery pipe, in any convenient manner. It will of course be understood that although the lower end of the vent pipe is described as at approximately the level of the top of the receptacle or, in other words, the level of discharge from the delivery hose, it may be located somewhat above or somewhat below such level.

I claim as my invention:

In an apparatus of the character described, the combination of an elevated source of liquid supply, a gravity delivery hose leading therefrom of such length that a portion thereof may extend below the delivery end, and a vent pipe having its lower end in operative connection with the delivery hose at a point a substantial distance below the inlet end of the hose and having its upper end above the level of the source of supply.

This specification signed this 6th day of January A. D. 1927.

WILLIAM L. MARDEN.